United States Patent [19]

Heneby et al.

[11] 3,903,217

[45] Sept. 2, 1975

[54] COOLING TOWER

[75] Inventors: Hans Heneby, Enebyberg; Per Norback, Lidingo, both of Sweden

[73] Assignee: Aktiebolaget Carl Munters, Sollentuna, Sweden

[22] Filed: Dec. 14, 1973

[21] Appl. No.: 424,730

[52] U.S. Cl. ......... 261/111; 261/DIG. 11; 312/205; 312/229
[51] Int. Cl. ............................................... B01f 3/04
[58] Field of Search............ 261/111, DIG. 11, 112, 261/24; 312/21, 29, 119, 273, DIG. 15, 205, 229, 249

[56] References Cited
UNITED STATES PATENTS

| | | | |
|---|---|---|---|
| 2,203,008 | 6/1940 | Bauman | 312/273 X |
| 2,660,502 | 11/1953 | Smith | 312/21 |
| 2,783,982 | 3/1957 | Kahl | 261/DIG. 11 |
| 2,791,408 | 5/1957 | Lewis | 261/DIG. 11 |
| 2,809,818 | 10/1957 | Munters | 261/DIG. 11 |
| 2,906,512 | 9/1959 | Meek | 261/24 |
| 3,363,885 | 1/1968 | Meek | 261/DIG. 11 |
| 3,415,502 | 12/1968 | Munters | 261/DIG. 11 |
| 3,437,319 | 4/1969 | Engalitcheff, Jr. et al. | 261/29 |

*Primary Examiner*—Tim R. Miles
*Assistant Examiner*—Richard L. Chiesa
*Attorney, Agent, or Firm*—Shlesinger, Fitzsimmons & Shlesinger

[57] ABSTRACT

This cooling tower comprises a box-shaped casing and two separate contact bodies. The casing is hollow and contains a chamber into which the two contact bodies fit when the tower is being transported. In operation, the two contact bodies are disposed outside of said chamber and at opposite sides of the casing.

2 Claims, 3 Drawing Figures

COOLING TOWER

This invention relates to cooling towers of the cross-flow type having a box-shaped casing which contains at least two contact bodies located adjacent vertical lateral walls of the casing and formed with passageways or channels extending from end to end for water supplied from above through conduits and for substantially horizontally flowing air introduced through openings in said side walls, the air escaping from an interspace existing between the contact bodies in upward direction to a suction fan located at the topside of the casing and equipped with an impeller.

Preferably the casing is rectangular and is elongated in bottom view.

From the viewpoint of costs and assembly it is advantageous to prefabricate the cooling towers in a factory so that they can be shipped as finished product units to the place of installation. The cooling towers can be given great dimensions, although as far as factory-made shippable units are concerned, their upward dimension is limited by the maximum of permissable volumes of goods to be shipped on road vehicles such as trucks. To give some idea of the importance of this limitation is may be mentioned that the prescribed US rules do not permit dimensions for shippable cooling towers exceeding a bottom area of 9 by 17 feet and a height of 10 feet.

Hitherto the available space has been utilized so that two contact bodies have been mounted adjacent the vertical short sides of the elongated casing of the cooling tower on either side of the central suction fan. The decisive factor for the capacity of the cooling tower is the double front area through which the air is sucked in at the short sides of the tower.

According to the invention a substantial increase of the front area can be provided by having at least one of the contact bodies displaceable in its opening in the side wall from a shipping position where it is wholly or at least substantially wholly within the casing into a position of operation where the contact body wholly or at least to a substantial part is located outside said lateral wall.

As the impeller of the fan, in order to keep the velocity of the air passing through the fan and thus the pressure drop within the impeller within expedient values, must have a diameter approaching the breadth of the casing, the contact bodies in their operative position with their upper edges kept altogether clear of the impeller so that the total area thereof can be utilized for the passage of the air. This effect becomes particularly prominent when the rectangular cooling tower is elongated in its horizontal extension and the contact bodies are located adjacent the vertical longitudinal sides thereof. The advantageous design of the cooling tower according to the invention is further improved by the feature that the depth of the contact bodies in the horizontal direction of flow of the air has been reduced considerably by using particular structures developed by the applicant while the cooling capacity has remained unchanged or even been improved. By virtue of the present invention the front area for the air and therewith the capacity of the cooling tower can almost be doubled over that of the known construction within the dimensions for the cooling tower permitted as maximum values from the viewpoint of shipping.

Further objects and advantages of the invention shall become apparent from the following description, considered in connection with the accompanying drawings which form part of the specification and of which:

Figure 1:
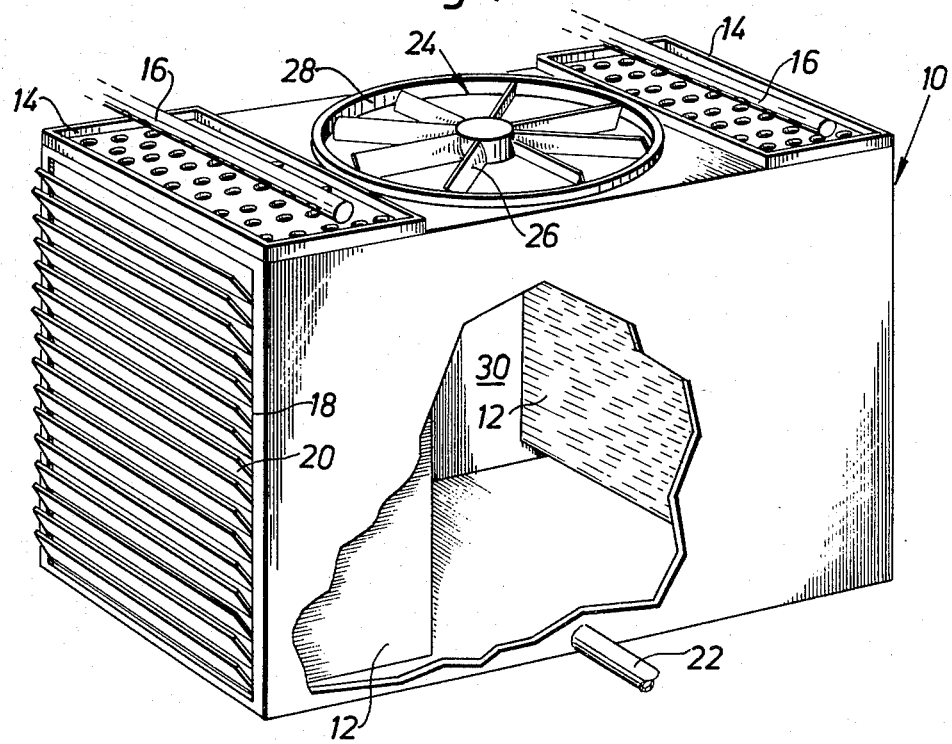
FIG. 1 is a perspective view of a cooling tower of previously known construction with a part of the casing thereof assumed cut away for obtaining greater clearness.

In the known construction represented in FIG. 1 reference numeral 10 denotes a casing of e.g. metal sheet having the shape of an elongated box with right or generally right angles between the various walls thereof. Mounted adjacent the vertical short sides are contact bodies 12 which are formed with channels or passageways extending from end to end both in the vertical and the horizontal directions. These channels are intended to be passed by water in mainly vertical direction and by air for cooling the water in mainly horizontal direction. The water is supplied from above from a trough 14 formed with perforations and tubes 16 formed with discharge openings. The water is distributed over the trough and flows downwards through the channels of the contact body within which it meets the air flowing in cross-stream which air has been taken in through an opening 18 each at both short sides of the casing. The openings 18 can be covered with a grated screen 20 e.g. to prevent water from splashing out. As already mentioned, the water is cooled by the air and collected at the bottom of the casing to be discharged through a conduit 22 to a place of utilization such as the condenser of an airconditioning apparatus. The air is sucked in through the openings 18 and caused to pass the channels of the contact body by a motor driven fan 24 having an impeller 26 which rotates about a vertical shaft in an opening 28 formed in the horizontal top wall of the casing. The impeller 26 must be given relatively great dimensions in order to prevent the pressure drop therein from becoming unduly high with due regard to both the fan work and the creation of disturbing noise. Therefore, the diameter of the impeller occupies the major part of the breadth of the cooling tower. Formed below the impeller is a space 30 through which the air after passage through the contact bodies streams upwards to the fan 24.

Cooling towers of this type are produced in a factory so as to be prefabricated units ready to be mounted at the place of installation in order in this way to attain optimum performance and lowest possible costs of production. As already stated above, the dimensions of the tower are limited by the maximum load volume allowed for the shipping vehicles. According to the invention, the capacity of the cooling towers can be increased considerably within the same external dimensions by giving them the structure illustrated in FIGS. 2 and 3. In these Figures the same reference numerals as in FIG. 1 have been used for the same or equivalent parts.

Figure 2:
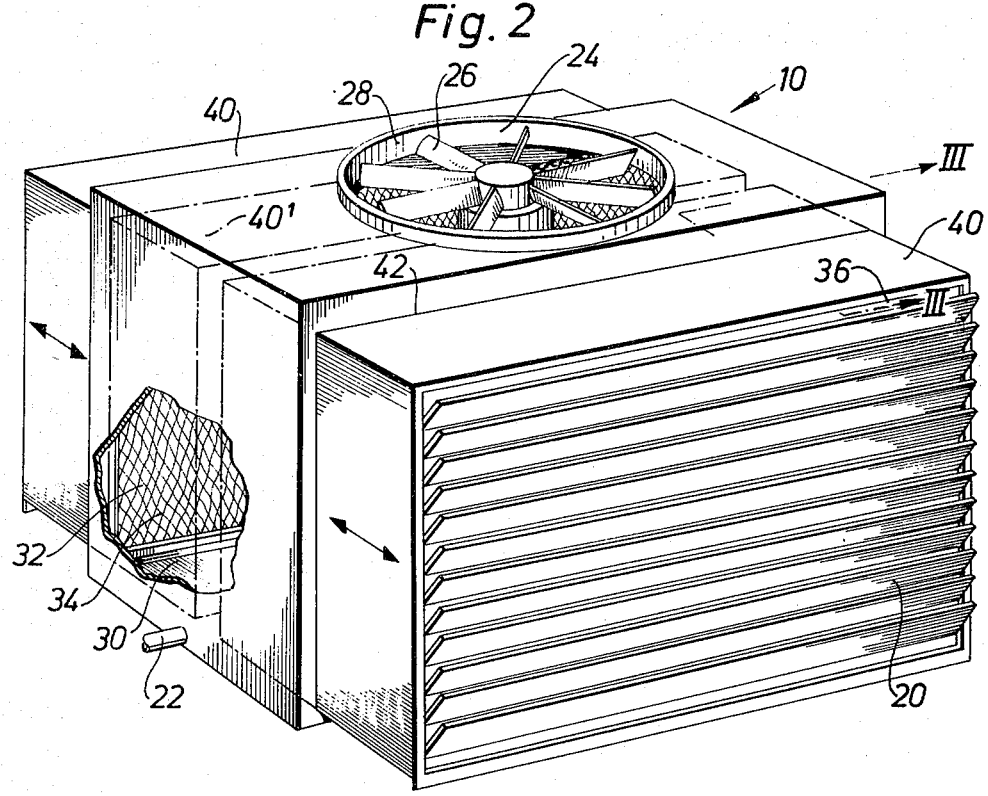
FIG. 2 is a perspective view of a cooling tower embodying the features of the invention and partly assumed cut open.
Figure 3:
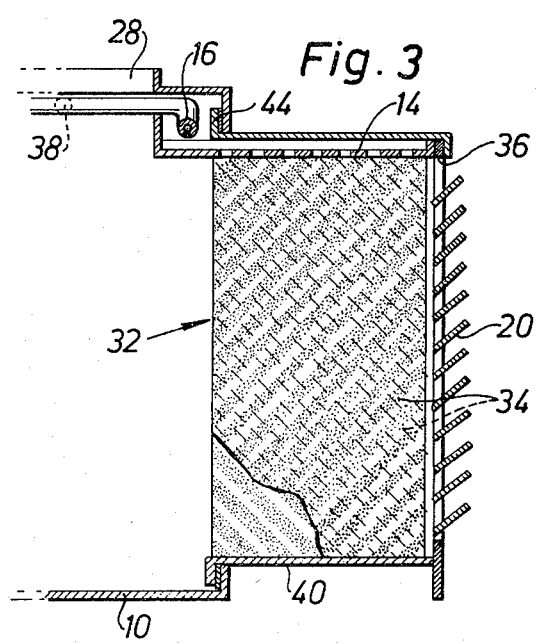
FIG. 3 is a sectional view following the line III—III of FIG. 2.

According to FIG. 2, two contact bodies 32 are mounted along two longitudinal walls of the casing 10, the length of said bodies substantially corresponding to that of said longitudinal walls. Each of the contact bodies may be built up of one or several fill units of which each is composed of layers or sheets 34 which all are corrugated but have the corrugations inclined in opposite directions in each second layer. The layers or sheets may be made of cellulose or asbestos or of some suitable plastic material. Thin layers or sheets of such paper are given required wet strength by impregnation with a plastic material insoluble in water such as melamine or phenol. Between these sheets or layers channels or passageways are formed at right angles to the long walls of the casing and which extend from end to end in all directions and the breadth of which thereof is from zero at the places of contact to the double height of the corrugations. The height of these corrugations may be of the order of magnitude from 8 to 20 mms. Contact bodies of this type are known e.g. from the British Patent specifications 1,055,796; 1,073,315 and 1,106,566. They permit a very high yield of heat exchange per unit of volume between the two media passing therethrough and may therefore be given a depth in the direction of flow of the air which is restricted to the order of magnitude of 0.6 meters within the limits 0.25 to 0.8 meters, for which reason the interspace 30 betwen the two contact bodies becomes sufficiently great to ensure even discharge of the air from all parts of the contact bodies to the fan 24.

The contact bodies 32 are located within slidable boxes 40 which are displaceable within openings 42 occupying the major part of the associated longitudinal wall of the casing 10. These slidable boxes and therewith the contact bodies 32 occupy substantially the entire area of the vertical longitudinal wall, which means that they extend up to adjacent the top surface of the casing. The inlet openings 36 in the casing 10 for the air are located in the outwards facing walls of the slidable boxes and covered by a grating or lattice-work 20. When the cooling tower is shipped the slidable boxes are pushed in so as to take the position inside the casing 10 indicated by the dashed and dotted lines 40'. Their outer sides thus coinside totally or at least approximately with the longitudinal walls of the casing. At the place of installation the slidable boxes are drawn out to the position shown by full lines, in which position their upper edges are clear of the impeller 26. As is especially evident from FIG. 3, the troughs 14 are located inside the sliding boxes 40 and have a width slightly exceeding that of the boxes so that in the position of operation also the stationary distributor tube 16 is above the trough. Thus, the water supplied to said tube has the possibility of streaming over the whole bottom area of the trough 14 to be distributed evenly over the upper surface of the contact body. The supply tubes 16 may be fed with water from a common feeder conduit 38. On their inwards facing sides the slidable boxes 40 are provided with outwards bent flanges 44 which form a stop for the boxes when these are drawn out and which may be combined with sealing means to counteract air leakage. The water which flows over the surfaces 32 of the contact body is collected in the bottom part of the slidable boxes and flows therefrom to the discharge tube 22 in the central portion of the casing. In this case, the contact bodies can be given so great a depth that they in shipping position occupy almost the entire breadth of the casing.

Obviously, the invention is not limited to the embodiment shown, but may be varied in many respects within the basic idea thereof. It is possible to arrange two slidable boxes with contact bodies which each have a length corresponding to one half of the length of a longitudinal wall of the casing and which are pivotably supported in the casing at the corners of the short sides. It is only essential that those portions of the contact bodies which in the shipping position are located straight below the impeller can be pushed outwards so much that in the position of operation the opening to the fan is unobstructed. Contact bodies may also be located adjacent all vertical sides of the casing, in particular when this casing has elongated configuration in horizontal direction in which construction at least two of the bodies are displaceable into a position of operation substantially outside the side walls of the casing.

In order to fully utilize the front area two fans disposed in parallel adjacent the inside of the casing may come into consideration, whereby the total quantity of air can be increased while retaining low velocity of the air passing through the fans, which is of importance for creation of low noise and/or low discharge losses.

In the preceding description, particular consideration has been paid to the importance of the invention for increase of the cooling capacity. Of course, the greater front area available according to the invention can also be utilized to reduce fan work with the cooling capacity remaining unchanged, which in some cases is of importance from the view-point of energy costs and/or protection against noise.

What is claimed is:

1. In a cooling tower shippable as a unit on road vehicles and comprising
   a box-shaped casing of rectangular cross-section, which has parallel side walls,
   two contact bodies, which in operation of the tower are disposed, respectively, outside of and adjacent said parallel side walls,
   means for conducting water to the tops of said contact bodies,
   said contact bodies having a plurality of passageways therein extending from end to end for carrying water therethrough, and a plurality of openings through which air may flow horizontally,
   said casing being hollow and having a chamber therein, and
   a suction fan disposed at the top side of said casing and equipped with a rotatable impeller, which, upon rotation thereof, draws air through said openings and said chamber and exhausts the air out the top of said casing, the improvement wherein
   said chamber is of a size sufficient to receive both said contact bodies, and
   said two contact bodies are mounted to be slidable into and out of said chamber, whereby during shipment of said tower said two contact bodies may be disposed substantially wholly within said chamber, and during operation of said tower may be located outside said side walls.

2. A cooling tower as claimed in claim 1, wherein said water conducting means comprises two conduits, one associated with each contact body, said conduits are fixed in said casing, and there is a perforated trough mounted at the top of each contact body to receive water from the associated conduit and distribute the water into the passageways of the contact body, said troughs being fixed to the respective contact bodies to be slidable therewith into and out of said chamber, and stop means on each trough engageable with cooperating means on said casing to limit the outward sliding movement of the associated contact body.

* * * * *